UNITED STATES PATENT OFFICE.

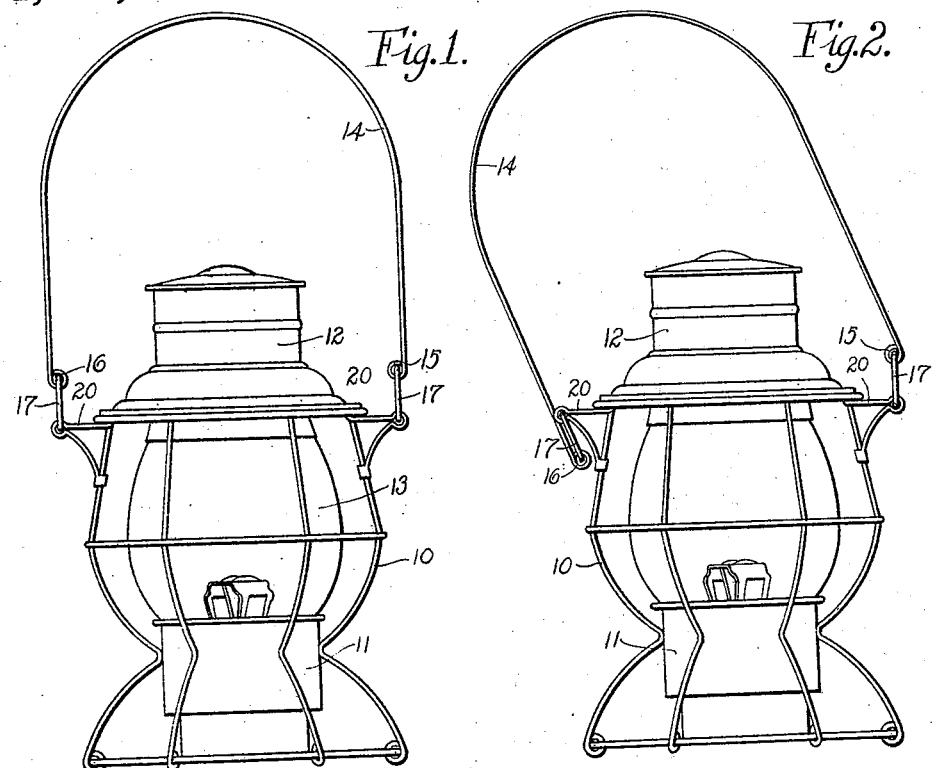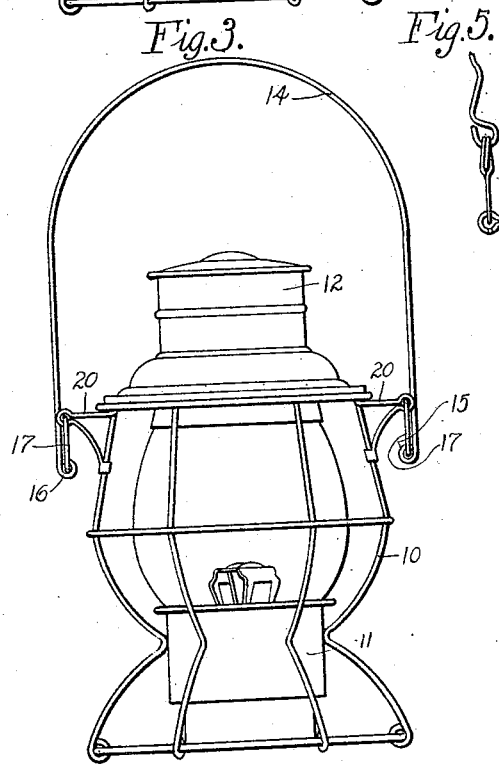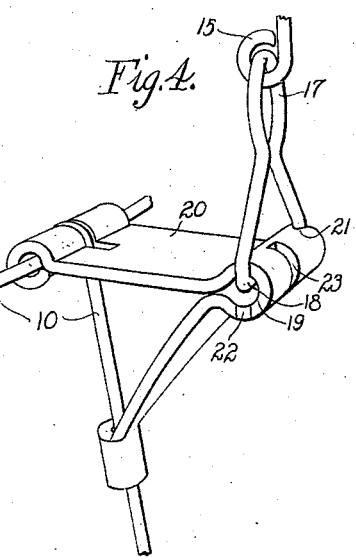

WILLIAM S. HAMM, OF HUBBARD WOODS, ILLINOIS, ASSIGNOR TO THE ADAMS & WESTLAKE COMPANY, A CORPORATION OF ILLINOIS.

LANTERN.

1,415,635.  Specification of Letters Patent.  Patented May 9, 1922.

Application filed July 11, 1921. Serial No. 483,770.

*To all whom it may concern:*

Be it known that I, WILLIAM S. HAMM, a citizen of the United States, and resident of Hubbard Woods, county of Cook, and State of Illinois, have invented certain new and useful Improvements in Lanterns, of which the following is a specification and which are illustrated in the accompanying drawings, forming a part thereof.

The invention relates to lanterns especially adapted for the use of trainmen, its object being to provide an improved form of bail attachment therefor.

The lantern to which the invention appertains is used by trainmen not only for the purpose of giving them the necessary light in doing their work, but also in the giving of signals. The signals used are various and are given by swinging the lantern or holding it in special positions. Some of the signals are more easily given if the bail is rigidly attached to the body, while in others a swinging bail is to be preferred.

The object of this invention is to provide an attachment for the bail which will enable the user to readily change it from the swinging to the fixed type. A further object is to provide for so positioning the bail that material tilting of the lantern may be avoided.

The invention consists in a structure such as is hereinafter described, and which is illustrated in the accompanying drawings, in which—

Figs. 1, 2 and 3 are side elevations of a lantern showing the bail in three possible positions of attachment;

Fig. 4 is a detail of the bail attaching mechanism; and

Fig. 5 is a detail showing a modified form of such mechanism.

The lantern shown is of the ordinary form, comprising a skeleton frame 10, a base ring 11, a dome 12, and a globe 13. The bail 14 is formed of heavy gauge wire bent to U form, and having loops 15, 16, at its ends, each of which loosely receives the bow of a U-shaped spring link 17, the free ends of which, as 18, are bent inwardly to form pivots entering a suitable bearing eye 19, formed in a bracket 20 secured to the frame 10. The ends of the eye 19 are notched above and below, as shown at 21, 22.

When the links 17 are swung upwardly to the position shown in Fig. 1, their side members spring into the upper notches 21 and the links are thereby held rigidly in an upright position and the bail is free to swing with reference to the lantern body. When the links 17 are swung downwardly to the position shown in Fig. 3, their side members enter the notches 22, holding the links rigid in a vertical position, and the side members of the bail 14 spring into a vertical slot 23 formed across the outer face of the eye 19 midway between its ends, and the bail is thereby rigidly locked to the lantern frame.

When one of the links 17 is turned to its upper position and the other to its lower position, as in Fig. 2, the bail is held rigidly by the engagement of one of its side arms with the notch 23 of one of the eyes 19, the loops 15 being somewhat elongated, as shown, to permit this engagement, so that the lantern can be held at arm's length, as in giving the "go ahead" signal, without materially tilting its body, as the bail itself is tilted with reference to the vertical axis of the lantern.

While the links 17 are securely held by the engagement of their side members with the notches 21, 22, against displacement by any exigencies of use, they are readily shifted from one position to the other, as outward pressure will cause their side members to spread sufficiently to be released from the notches.

In Fig. 5 there is shown a modification of the links 17, the bow of the link being given a double turn to provide greater elasticity. The side arm of the bail is also shown as bowed outward near its end, permitting the pendent link to swing inward somewhat further when the position of Fig. 2 is assumed.

Various changes in details of construction may be made without departing from the scope of the invention.

I claim as my invention—

1. In a lantern, in combination, a frame, a pair of brackets secured to the frame and each, having a pivot eye, a pair of links pivotally engaging the bracket eyes, and a bail pivotally attached to the links.

2. In a lantern, in combination, a frame, a pair of brackets secured to the frame and each having a horizontal pivot eye, the ends of the eyes being vertically notched, a pair of U-shaped spring links having the ends of their side members turned inwardly to engage the eyes, and a bail pivotally attached to the links.

3. In a lantern, in combination, a frame, a pair of brackets secured to the frame and each having a horizontal pivot eye, the ends of the eyes being vertically notched, a pair of U-shaped spring links having the ends of their side members turned inwardly to engage the eyes, and a bail pivotally attached to the links, each eye being provided with a vertical notch in its outer side wall.

4. In a lantern, in combination, a frame, a bail jointed to flex transversely to its plane, its lower ends being pivoted to the frame to swing in the plane of the bail, and means for securing the lower sections of the bail in pendent position.

5. In a lantern, in combination, a frame, a bail jointed to flex transversely to its plane, its lower ends being pivoted to the frame to swing in the plane of the bail, and means for preventing the flexing of the bail when its lower portions are pendent.

6. In a lantern, in combination, a frame, a bail jointed to flex transversely to its plane, its lower ends being pivoted to the frame to swing in the plane of the bail, means for securing the lower sections of the bail in pendent position, and means for preventing the flexing of the bail when its lower sections are so secured.

7. In a lantern, in combination, a frame, a pair of brackets secured to the frame and each having a pivot eye, a pair of links pivotally engaging the bracket eyes, a bail pivotally attached to the links, and means for locking one of the links in one of its positions.

8. In a lantern, in combination, a frame, a pair of brackets secured to the frame and each having a pivot eye, a pair of links pivotally engaging the bracket eyes, a bail pivotally attached to the links, and means for locking one of the links in a plurality of its positions.

9. In a lantern, in combination, a frame, a pair of brackets secured to the frame and each having a pivot eye, a pair of links pivotally engaging the bracket eyes, a bail pivotally attached to the links, and means for locking the links in adjusted positions.

10. In a lantern, in combination, a frame, a pair of brackets secured to the frame and each having a pivot eye, a pair of links pivotally engaging the bracket eyes, a bail pivotally attached to the links, and means for locking the bail against swinging movement.

WILLIAM S. HAMM.